United States Patent
Fukuda et al.

(10) Patent No.: US 7,668,429 B2
(45) Date of Patent: Feb. 23, 2010

(54) LIGHT-DIFFUSIVE METHACRYLIC RESIN LIGHT GUIDE AND SURFACE LIGHT SOURCE DEVICE COMPRISING THE SAME

(75) Inventors: Iichiro Fukuda, Tsukuba (JP); Yoshiki Mukoo, Tsukuba (JP); Seiji Kinoshita, Tsukuba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 154 days.

(21) Appl. No.: 12/065,794

(22) PCT Filed: Sep. 5, 2006

(86) PCT No.: PCT/JP2006/317516

§ 371 (c)(1),
(2), (4) Date: Mar. 5, 2008

(87) PCT Pub. No.: WO2007/029679

PCT Pub. Date: Mar. 15, 2007

(65) Prior Publication Data

US 2009/0269008 A1    Oct. 29, 2009

(30) Foreign Application Priority Data

Sep. 6, 2005    (JP) .............................. 2005-257280

(51) Int. Cl.
*G02B 6/10* (2006.01)
(52) U.S. Cl. ........................................ 385/129; 385/130
(58) Field of Classification Search .......... 385/129–132
See application file for complete search history.

(56) References Cited

U.S. PATENT DOCUMENTS 6,347,874 B1 * 2/2002 Boyd et al. .................. 362/628
6,379,016 B1 * 4/2002 Boyd et al. .................. 362/625

FOREIGN PATENT DOCUMENTS

| JP | 4 136977 | 5/1992 |
|---|---|---|
| JP | 7 199116 | 8/1995 |
| JP | 8 304631 | 11/1996 |
| JP | 2001 195914 | 7/2001 |
| JP | 2003 523536 | 8/2003 |
| JP | 2005 142164 | 6/2005 |

* cited by examiner

*Primary Examiner*—Kevin S Wood
(74) *Attorney, Agent, or Firm*—Oblon, Spivak, McClelland, Maier & Neustadt, L.L.P.

(57) ABSTRACT

This invention provides a methyl methacrylate resin light guide for use in a surface light source device. The methyl methacrylate resin light guide can reduce the occurrence of dark lines and can improve the screen image quality of a surface light source device. The light guide characterized by including a methyl methacrylate resin and fine particles. Herein, not less than 0.01 parts by mass and not more than 0.5 parts by mass of the fine particles are dispersed in 100 parts by mass of the methyl methacrylate resin. In addition, the absolute value of a difference in refractive index between the fine resin particles and the methyl methacrylate resin is not less than 0.001 and not more than 0.02, the fine resin particles have an average particle size of not less than 1 μm and not more than 10 μm.

29 Claims, 4 Drawing Sheets

LIGHT-DIFFUSIVE METHACRYLIC RESIN LIGHT GUIDE AND SURFACE LIGHT SOURCE DEVICE COMPRISING THE SAME

TECHNICAL FIELD

The present invention relates to a light guide for use in an edge-light type-surface light source device and a surface light source device including the same.

BACKGROUND ART

Liquid crystal displays including backlights are widely used. In such a liquid crystal display, an image displayed on a liquid crystal display element is visualized by light that is emitted from a surface light source device placed in a backlight section and that is transmitted through the liquid crystal display element. Such surface light source devices for backlights are classified into two types; edge-light type surface light source devices and direct surface light source devices. Each edge-light type surface light source device has primary light sources in side surfaces of light guiding plates, and is more effective in thickness reduction than the direct surface light source devices. Accordingly, the edge-light type surface light source devices are widely used as display units of portable laptop computers, monitors and the like.

In such an edge-light type surface light source device, the light guiding plate is a panel of transparent resin or the like. This light guiding plate has an entrance end surface between an exit surface and a bottom surface opposite to the exit surface. In the entrance end surface, a primary light source such as a linear or dot-shaped light source is provided. Moreover, in the exit and bottom surfaces, white dots or fine patterns are formed for adjustment to increase efficiency in extracting light through the exit surface. Light emitted from the primary light source is therefore entered the light guiding plate through the entrance end surface, guided within the light guiding plate, and then emitted from the exit surface to a liquid crystal display element section.

As the light control pattern of the light guide, a parallel pattern formed in both of the exit and rear surfaces is known (for example, see Patent document 1).

Figure 1:
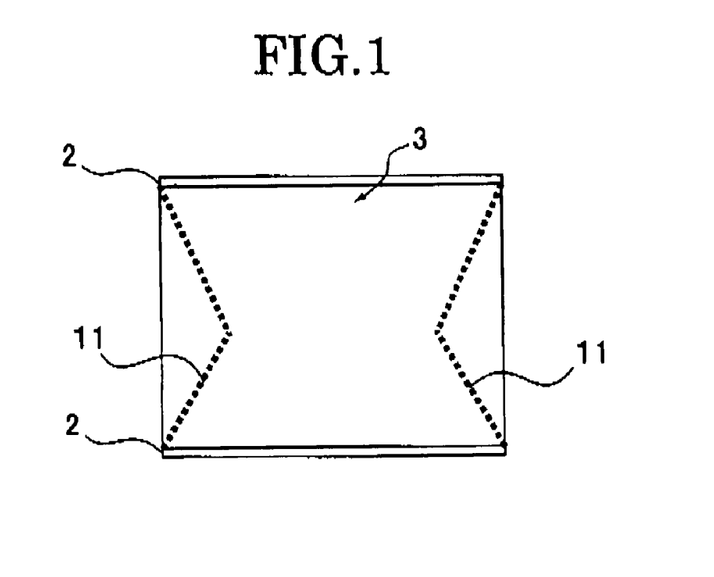
FIG. 1 is a view for explaining dark lines occurring from corners of a conventional light guide.

In the light guide having such a shape, as shown in FIG. 1, there are extremely strong dark lines 11 seen in corners and notches of a light guide 3. In order to eliminate such a defect, it is necessary to use a diffusion sheet or the like for an improvement in the screen image quality while sacrificing the brightness performance.

For another purpose, there is a known method of adding a light-diffusive resin composition (a diffusing agent) for use in a light guide, in which an examination is being made for a wedge-type light guide to balance light transmission and diffusion by blending, at a low concentration, a diffusing agent being significantly different in refractive index from a base material and having a high diffusion efficiency (for example, see Patent document 2).

However, in the case of using the diffusing agent described in Patent document 2 as a method to reduce dark lines, the diffusing performance greatly changes as the concentration changes a little because of the high diffusion efficiency thereof. Accordingly, the aforementioned method is improper for a case where the diffusing performance needs to be finely changed like a case of reducing dark lines while keeping the optical performance.

Patent document 1: JP-A 2005-142164

Patent document 2: JP-A H7-199116

DISCLOSURE OF THE INVENTION

Problems to be Solved by the Invention

An object of the present invention is to, in an edge-light type light guide often used as a backlight of a monitor, provide a methacrylic resin light guide which can reduce the occurrence of dark lines and easily improve screen image quality while keeping the optical performance.

Means for Solving the Problems

To solve the aforementioned problems, a light guide of the present invention for use in a surface light source device is characterized by including methyl methacrylate resin as base material (matrix) and fine particles. Herein, not less than 0.01 parts by mass and not more than 0.5 parts by mass of the fine particles are dispersed in 100 parts by mass of the methyl methacrylate resin. In addition, the absolute value of a difference in refractive index between the fine resin particles and the methyl methacrylate resin is not less than 0.001 and not more than 0.02, the fine resin particles have an average particle size of not less than 1 μm and not more than 10 μm.

EFFECTS OF THE INVENTION

The light guide of the present invention can easily improve the screen image quality while keeping the current optical performance to a certain degree. Accordingly, the light guide provides an effect on an improvement of the screen image quality in a case where dark lines occurring at corners and notches of the light guide cause a problem.

BEST MODE FOR CARRYING OUT THE INVENTION

The present invention is described in detail below.

A light guide of the present invention is characterized by including methyl methacrylate resin as base material (matrix) and fine particles. Herein, not less than 0.01 parts by mass and not more than 0.5 parts by mass of the fine particles are dispersed in 100 parts by mass of the methyl methacrylate resin. In addition, the absolute value of a difference in refractive index between the fine resin particles and the methyl methacrylate resin is not less than 0.001 and not more than 0.02, the fine resin particles have an average particle size of not less than 1 μm and not more than 10 μm.

One type of methyl methacrylate resin used as base resin in the present invention is a methyl methacrylate homopolymer. Herein, the methyl methacrylate homopolymer only should be a polymer obtained by polymerizing substantially only methyl methacrylate. Examples of the methyl methacrylate resin used as the base resin are copolymers of methyl methacrylate as a main component and a copolymerizable monomer such as methyl acrylate, ethyl acrylate, n-propyl acrylate, isopropyl acrylate, butyl acrylate, acrylonitrile, maleic anhydrate, styrene, and α-methylstyrene. The proportion of methyl methacrylate contained in the base resin is preferably not less than 50 mass % and more preferably not less than 80 mass %.

The fine particles (transparent fine particles) used in the present invention need to have an average particle size of not less than 1 μm and not more than 10 μm, preferably not less than 2 μm and not more than 10 μm, and more preferably not less than 2 μm and not more than 8 μm. When the average particle size of the fine particles is less than 1 μm, the resinus composition obtained by dispersing such fine particles in the base resin selectively scatters short wavelength light so that it tends to make transmitted light yellowish, which is not preferable. Accordingly, it is preferable that the number of particles having particle size of less than 1 μm is not more than 5% of the total. The fine particles each preferably have a shape of an elliptic sphere or a sphere, and more preferably have a sphere. The fine particles of an average particle size of more than 10 μm has weak forward scattering and strong backward scattering, thus deteriorating the rectilinear propagation of light, which is not preferable.

The average particle size in this specification means a number average particle size (diameter) obtained by actual measurement using photographs obtained by electron microscope observation as described later.

Preferably, the aforementioned fine particles are excellent in balance between light diffusing and transmitting properties and have particle size uniformed in a certain range in order to prevent unevenness in chromaticity in being used as a light guide. For example, the coefficient of variation (a CV value) later described as an index of the particle size distribution is preferably not more than 50% and more preferably not more than 20%.

The composition of the fine particles used in the present invention is not particularly limited. The fine particles are preferably fine resin particles composed of (meth)acrylate (acrylate or methacrylate), a crosslinkable monomer and another copolymerizable monomer as needed. The fine particles are more preferably fine resin particles obtained by polymerizing alkyl (meth)acrylate and a crosslinkable monomer, or fine resin particles obtained by polymerizing alkyl (meth)acrylate, a crosslinkable monomer, and another copolymerizable monomer.

The fine particles used in the present invention are not necessarily limited to fine particles of one type. The fine particles may include multiple types of fine particles which satisfy predetermined conditions of the refractive index and particle size.

The aforementioned (meth)acrylate is not particularly limited but is preferably, for example, an alkyl acrylate and/or alkyl methacrylate with an alkyl group having 1 to 12 carbon atoms. Concrete examples of the monomer (alkyl acrylate and/or alkyl methacrylate with an alkyl group having 1 to 12 carbon atoms) are methyl acrylate, ethyl acrylate, propyl acrylate, butyl acrylate, 2-ethylhexyl acrylate, decyl acrylate, dodecyl acrylate, 2-hydroxyethyl acrylate, trifluoromethyl acrylate, trifluoroethyl acrylate, methyl methacrylate, ethyl methacrylate, propyl methacrylate, butyl methacrylate, 2-ethylhexyl methacrylate, decyl methacrylate, dodecyl methacrylate, trifluoromethyl methacrylate, trifluoroethyl methacrylate, 2-hydroxyethyl methacrylate, dimethylaminoethyl acrylate, dimethylaminoethyl methacrylate, quaternized derivatives of the above monomers, acrylamide, methacrylamide, N-methylolacrylamide, N,N-dimethylacrylamide, acrylamide-2-methylpropanesulfonate, and sodium salts thereof. These monomers may be used singly or in combination. Among these, the (meth)acrylate is preferably an alkyl acrylate with an alkyl group having 1 to 8 carbon atoms, an alkyl methacrylate with an alkyl group having 1 to 8 carbon atoms or a mixture thereof, and more preferably methyl methacrylate, methyl acrylate or a mixture thereof.

The aforementioned (meth)acrylate is preferably used in not less than 20 mass % and not more than 99.9 mass % of the total amount of the used monomers, more preferably used in not less than 30 mass % and not more than 99 mass %, and still more preferably used in not less than 60 mass % and not more than 96 mass %. Specifically, when the fine particles are made of methacrylate polymer, the proportion of the methacrylate in the fine particles is preferably not less than 20 mass % and not more than 99.9 mass %, more preferably not less than 30 mass % and not more than 99 mass %, and still more preferably not less than 60 mass % and not more than 96 mass %. Furthermore, when the fine particles are particles of resin composed of acrylate and methacrylate, the proportion of the total of the acrylate and methacrylate in the fine particles is preferably not less than 20 mass % and not more than 99.9 mass %, more preferably not less than 30 mass % and not more than 99 mass %, and still more preferably not less than 60 mass % and not more than 96 mass %. Suppose a case where the base material is methacryl resin, for example. In this case, when the amount of (meth)acrylate blended is not less than 20 mass % and not more than 99.9 mass %, the difference in Abbe's number between the manufactured fine resin particles and base resin is small, diffused light is accordingly prevented from changing in color depending on the angle of view, which is preferable.

The crosslinkable monomer, which is not particularly limited, preferably has two or more unsaturated groups. Examples thereof are divinyl and try vinyl monomers such as divinylbenzene, ethylene glycol dimethacrylate, 1,3-butylene glycol dimethacrylate, trimethylolpropane trimethacrylate, and aryl methacrylate. These monomers may be used singly or in combination. Preferably, the crosslinkable monomer is divinylbenzene, ethylene glycol dimethacrylate, trimethylolpropane trimethacrylate, or the like.

The aforementioned crosslinkable monomer is preferably used in 0.1 to 80 mass % of the total amount of the used monomers, more preferably used in not less than 1 mass % and not more than 70 mass %, and still more preferably used in not less than 4 mass % and not more than 40 mass %. When the amount of the crosslinkable monomer blended is not less than 0.1 mass % and not more than 80 mass %, the manufactured fine resin particles are sufficiently crosslinked and capable of sufficiently keeping the shape thereof after being fused and mixed with the base resin.

The aforementioned fine particles may contain other monomers copolymerizable with acrylate and/or methacrylate and the aforementioned crosslinkable monomer. The above "other monomers" copolymerizable with (meth)acrylate, the crosslinkable monomer and the like are not particularly limited. Examples thereof are other ethylene-type unsaturated monomers. To be more specific, examples thereof includes olefins such as ethylene, propylene, and isobutylene; halogenated olefins such as vinyl chloride, vinyl fluoride, vinylidene chloride, and vinylidene fluoride; vinyl esters such as vinyl formate, vinyl acetate, vinyl propionate, and vinyl versatate; styrene-type monomers such as styrene, α-methylstyrene, p-styrenesulfonate, sodium salts thereof, and potassium salts thereof; and N-vinylpyrrolidone. These other monomers can be used singly or in combination. The aforementioned other monomers are not essential in the fine resin particles used in the present invention and are generally used in a range of more than 0 mass % and not more than 79.9 mass %, preferably more than 0 and not more than 40 mass %, and more preferably more than 0 and not more than 20 mass %.

From the perspective of preventing color from changing in a manner that depends on the angle of view, it is preferable that the absolute value of a difference in refractive index between the fine resin particles used in the present invention and the matrix part (base resin) in which the fine resin particles is to be dispersed is not less than 0.001 and not more than 0.02. For example, the absolute value of the difference in refractive index between the matrix part and the fine resin particles exceeds 0.02, the difference in Abbe's number between the fine resin particles and base resin increases while the light diffusivity increases, and the diffused light tends to change in color in a manner that depends on the angle of view.

A method of manufacturing the fine resin particles used in the present invention is not particularly limited. However, the fine resin particles can be suitably manufactured by aqueous suspension polymerization as described above. In the aqueous suspension polymerization, a polymerization initiator is blended as a disperse phase component in addition to the above monomers, and stabilizers such as heat and light stabilizers and additives such as pigment may be further blended.

Examples of the polymerization initiator used in manufacturing fine resin particles by aqueous suspension polymerization may be: acyloyl peroxide such as benzoyl peroxide and lauroyl peroxide; alkyl peroxide such as cumene hydroperoxide, t-butyl perbenzoate, and i-propyl peracetate; dialkyl peroxide such as di-t-butyl peroxide; azobisacylonitrile such as azobisisobutylonitrile, azobiscyclohexanecarbonitrile, and 2,2-azobis-2,4-dimethylvaleronitrile. In addition to the above substances, it is possible to use: a redox polymerization initiator composed of a combination of a peroxide and a reductant; and a light polymerization initiator such as α, α-dimethoxy-α-morpholino-methyl thiophenyl acetophenone, 2,4,6-trimethyl benzoyl phosphine oxide, benzophenone, thioxanthone, and tetramethyl thiuram monosulphide. Amounts of the aforementioned polymerization initiators are usually not less than 0.05 parts by mass and not more than 10 parts by mass with respect to 100 parts by mass of the total amount of the blended monomers, and preferably not less than 0.5 parts by mass and not more than 3 parts by mass.

The solvent used in the aqueous suspension polymerization is usually water such as pure water but may be ethylene glycol, glycerin ethanol, methanol, or a combination of the same. In the light of obtaining uniform fine particles, it is preferable to add a surfactant, a suspension stabilizer, and the like to the above solvent. For example, use of the suspension stabilizer can reduce aggregates produced in polymerization and provide fine resin particles with more uniform particle size, which is preferable.

Examples of the aforementioned surfactant are: anionic surfactants such as sodium dodecylbenzenesulfonate, sodium lauryl sulfate, dialkyl sodium sulfosuccinate, and a formalin condensation of naphthalenesulfonate; cationic surfactants such as alkyl ammonium salt, alkyl benzylammonium salt, betaine, imidazolium betaine, and lecichine; non-ionic surfactant such as polyoxyethylene nonylphenol ether, polyethylene glycol monostearate, and sorbitan monostearate. Preferably, in the light of the stability of the suspension liquid and the like, the usage amounts of these surfactants are usually not less than 0.1 mass % and not more than 10 mass % with respect to the total amount of the solvent.

Examples of the aforementioned suspension stabilizer are: hydrophilic synthetic polymers such as polyvinyl alcohol, polyvinylpyrrolidone, and polyethyleneglycol; organic suspension stabilizers such as hydrophilic semisynthetic polymers including carboxymethylcellulose; and inorganic suspension stabilizers such as phosphates of magnesium, barium and calcium, calcium carbonate, magnesium carbonate, zinc oxide, aluminum oxide, and aluminum hydroxide. In the light of the stability of the suspension liquid and the like, it is preferable that amounts of these suspension stabilizers added are usually not less than 0.1 mass % and not more than 20 mass % with respect to the total amount of the continuous-phase liquid.

In the light of productivity, uniformity of the particle size, and the like, amounts of the monomers added in the aforementioned aqueous suspension polymerization are usually not less than 1 part by mass and not more than 100 parts by mass with respect to 100 parts by mass of the aqueous solvent and preferably not less than 8 parts by mass and not more than 80 parts by mass.

A method of blending the fine resin particles obtained by the aforementioned method in the base resin is not particularly limited. Examples thereof are: a method of previously mixing the fine resin particles into pellets of the base resin and performing extrusion or injection molding on the resultant mixture into a form of pellets or the like to obtain the light diffusive resin composition; and a method of once compounding the base resin and the fine resin particles into a masterbatch, then further performing extrusion or injection molding on the base resin and the master batch into a form of pellets containing the fine resin particles in a desired amount, thereby obtaining the light diffusive resin composition.

The proportion of the fine resin particles added to the base resin may be small as long as the effect of the present invention can be exhibited and not particularly limited. However, it is preferable that the proportion thereof satisfy the following conditions:

(i) With respect to 100 parts by mass of the base resin, the proportion of the resin particles is usually not less than 0.01 parts by mass and not more than 0.5 parts by mass and preferably not less than 0.02 parts by mass and not more than 0.2 parts by mass.

(ii) The absolute value of the difference in refractive index is not less than 0.001 and not more than 0.02 and preferably not less than 0.001 and not more than 0.014.

When the proportion of the resin particles added exceeds the aforementioned range (i), the light guide deteriorates in terms of the distribution of chromaticity, and when the proportion thereof is below the range (i), the effect on reducing dark lines are hardly obtained, and the light guide deteriorates in terms of image quality.

When the absolute value of the difference in refractive index is above the range of the above (ii), the diffusing efficiency is increased. This makes it difficult to adjust the amount of fine resin particles to be added, therefore increasing lot-to-lot variations. When the absolute value of the difference in refractive index is below the above range, the light diffusing efficiency is excessively low.

The thus-obtained light diffusive resin composition used in the present invention can be provided for various types of molding methods as are applied to normal methyl methacrylate resin, thus making it possible to manufacture a light guide of any shape and size.

The molding method employed is not particularly limited, and for example, can be various types of molding such as extrusion rolling, injection molding, and press molding. The fine resin particles used in the present invention can be directly added and mixed with a base resin forming monomer at cast molding to be polymerized and molded into a plate, a film, or another article.

For the light guide of the present invention, a panel-shaped light guide is suitable. Such a panel-shaped light guide includes an exit surface, a bottom surface opposite and parallel to the exit surface, and at least a pair of entrance end surfaces which are formed in side surfaces positioned between the exit and bottom surfaces and are opposite to each other. Herein, the exit and bottom surfaces only need to be substantially parallel to each other. The light guide having such a shape is used for a surface light source device including light sources at two, three, or four of the at least a pair of entrance end surfaces. This can reduce dark lines produced in the exit surface.

Another shape of the light guide of the present invention may be a shape which includes an entrance surface and has a wedge cross section having a thickness gradually reduced with distance from the entrance surface. The light guide having such a wedge cross section is used in a surface light source device including light sources in the above entrance surface. This can also reduce dark lines produced in the exit surface.

Furthermore, to increase the commercial value of the obtained light guide, it is allowed that small amounts of other additives, for example such as an inorganic pigment and a light stabilizer are added in such a range that allows the object of the present invention to be achieved. Moreover, for the purposes of adjusting brightness of the article as a product and the like, a surface of the light guide can be matted or formed to have prisms and an optical pattern simultaneously with molding or separately. It is especially preferable to form a light control pattern which controls outgoing light, in the exit surface of the light guide and/or bottom surface opposite to the exit surface. Such a light control pattern can be implemented by prisms with triangular or trapezoidal cross sections (see FIGS. 5 and 6) or a printed pattern. In the structure shown in FIG. 2, a light control pattern which makes such control that half-value angles in all directions at the center of the exit surface is not more than 60° is more suitable for the surface light source device. To be more specific, each of the exit and bottom surfaces is provided with a pattern with ridges and/or grooves formed at a predetermined pitch. The pattern formed in the exit surface is orthogonal to the entrance end surfaces, and the pattern formed in the bottom surface is parallel to the entrance end surfaces. In at least one of the exit and bottom surfaces, the ridges with trapezoidal cross sections and the grooves with trapezoidal cross sections are alternately arranged.

Dimensions of the light guide are not particularly limited if the light guide provides the light guiding performance and reduces dark lines. However, it is preferable that the light guide has a diagonal length of 10 to 24 inches and a plate thickness of 4 to 10 mm.

As for the haze value, it is desirable that the measured haze value of a plate with a same thickness as that of the objective light guide be 3 to 30%.

The chromaticity difference ($\Delta x$, $\Delta y$) of the light guide in a surface is preferably not more than 0.006 and more preferably not more than 0.004.

EXAMPLES

The present invention is described in more detail using examples below but not limited to these.

In the examples, "%" and a "part" indicate mass % and a part by mass, respectively, unless otherwise noted.

The measurement method and a method of evaluating physical properties in the examples are shown in the following.

(1) Average Particle Size and Coefficient of Variation (CV Value) of Fine Resin Particles Fine resin particles obtained by each of Examples and Comparative Examples were observed with a scanning electronic microscope (SEM), and the diameters of 200 particles were actually measured using the obtained photographs, thus calculating number average particle size and a standard deviation from the number average particle size.

Moreover, as an index of the particle size distribution, the coefficient of variation (CV value) represented in percentage (%) was calculated by the following equation.

$$CV=(\text{Standard deviation from average particle size}/\text{Average particle size})\times 100$$

The refractive index described in the examples indicates a refractive index measured at a measurement temperature of 25° C. with the sodium D line nd (587.6 nm) using a digital precision refractometer KPR-20 (Kalnew Co., Ltd).

(2) Image Quality

The image quality of the light guide was measured by the following method using the following light source.

Irradiation light source: Two cold cathodic fluorescent lamps (surface brightness: 37000 cd/cm$^2$) are provided in each long side of the light guide.

Figure 2:
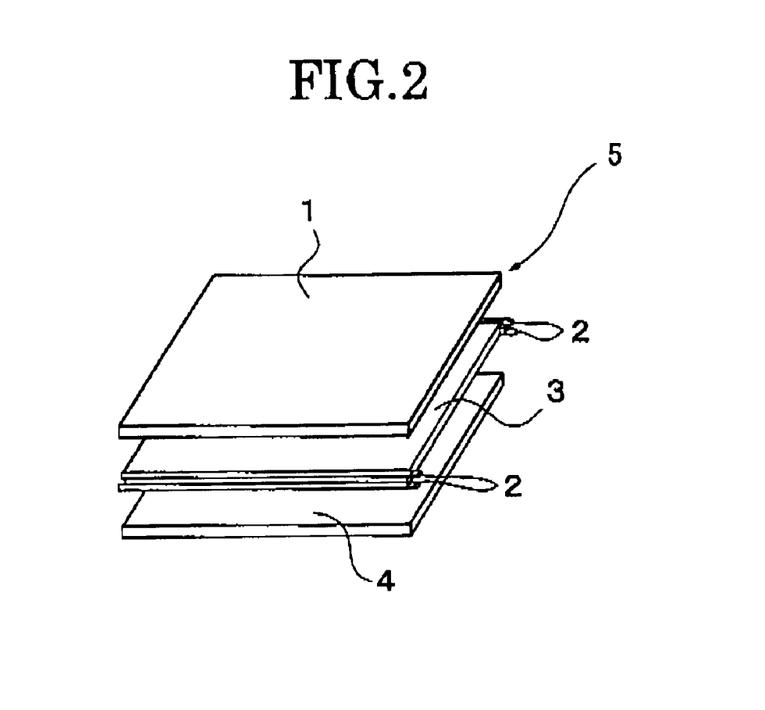
FIG. 2 is a view for explaining a structure of an edge-light type surface light source device (backlight) used for evaluation.

Measurement Method: A light guide having the pattern shown in FIG. 5 or 6 formed in each of the exit and reflection surfaces (278 mm×338 mm×6 mm) was disposed as shown in the constitution of FIG. 2 to manufacture the surface light source device 5, and then visual evaluation was conducted. The panel-shaped light guide having the pattern shown in FIG. 5 was provided with prisms 30 with triangular cross sections in the exit and bottom surfaces 13 and 23 as the light control pattern (Examples 1 to 3, Comparative Examples 1 to 3). As the light control pattern, the panel-shaped light guide having the pattern shown in FIG. 6 was provided with the ridges 13a having trapezoidal cross sections and the grooves 13b having trapezoidal cross sections which are alternately arranged and was further provided with multiple grooves 23a having V-shaped cross sections and being parallel to each other in a rear surface 23 opposite to the exit surface 13 (Examples 4 to 12, Comparative Examples 4 to 8).

(3) Front Brightness

Figure 3:
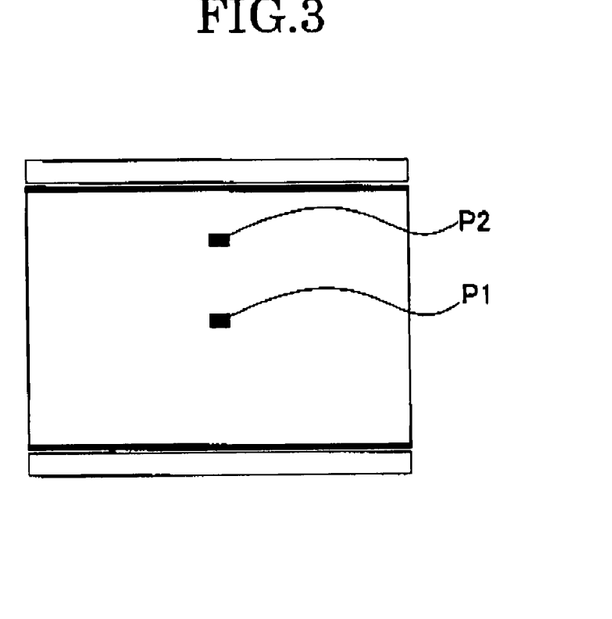
FIG. 3 is a schematic view showing measuring positions of surface brightness and chromaticity.

Front brightness at a center position P1 of the light guide shown in FIG. 3 was measure d by means of a brightness meter (SR-3, TOPCON CORPORATION) fixed at a position 40 cm away from the surface light source device.

(4) Chromaticity Measurement

Chromaticity of the light guide at each of points P1 and P2 disposed in a direction perpendicular to the light source 2 (the cold cathodic fluorescent lamp in each Example) was measured by a spectroradiometer (SR-3; TOPCON CORPORATION) 40 cm away from the surface light source device. Herein, as shown in FIG. 3, the point P1 is a center position of the light guide and the point P2 is 10 mm away from the light source. In the surface light source device 5, the reflecting sheet 4, light guide 3, and diffusive sheet 1 were sequentially arranged starting from the rear surface, and the light sources 2 are provided for a pair of entrance surfaces positioned in the side end surfaces of the light guide 3.

Example 1

Preparation of Resin Composition
(1) The following components were mixed to prepare the disperse phase liquid.

| Monomer components: | |
|---|---|
| Methyl methacrylate | 38.50 g |
| Styrene | 6.50 g |
| Ethylene glycol dimethacrylate | 5.00 g |
| Polymerization Initiator: | |
| Lauryl peroxide | 0.294 g |

(2) Next, the following components were dissolved and mixed to prepare continuous-phase liquid.

| | |
|---|---|
| Distilled water | 450 g |
| Poly vinyl alcohol | 2.93 g |
| (PVA-217; Kuraray Co., Ltd.) | |
| Sodium lauryl sulfate | 0.15 g |
| Sodium hydrogen carbonate | 0.23 g |
| Sodium nitrite | 0.294 g |

Figure 4:
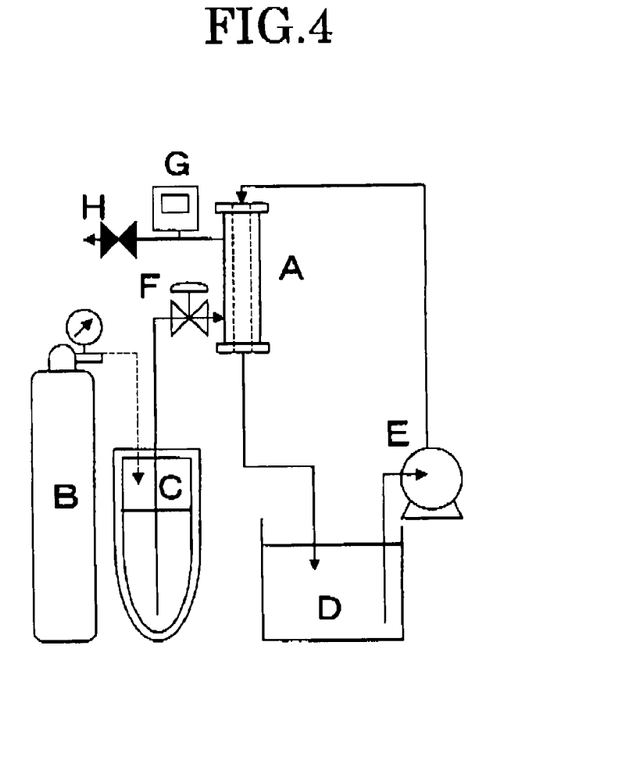
FIG. 4 is a schematic view of a membrane emulsification system.

(3) The disperse-phase liquid and continuous-phase liquid were put in tanks of a membrane emulsification system (see FIG. 4), which includes a membrane module A, a nitrogen gas cylinder B, a disperse-phase liquid storage tank C, a continuous-phase liquid circulation tank D, a circulation pump E, a first valve F, a measuring instrument G for pressure and the like, and a second valve H. The membrane module A includes a porous glass cylinder (pore size: 0.90 μm, cylinder diameter: 10 mm, cylinder length: 20 mm). Subsequently, the continuous-phase liquid was caused to flow through the porous glass cylinder, and then the disperse-phase liquid was injected into the porous glass cylinder from the outside with a pressure difference of 0.072 MPa (72 KPa) to obtain emulsion.

The thus-obtained emulsion was put in a 1000 ml separable flask, and the suspension liquid was stirred at 130 rpm in a nitrogen atmosphere for polymerization at 75° C. for 6 hours, thus producing the fine resin particles.

The obtained fine resin particles were found to have a refractive index of 1.507, a number average particle size of 3.1 μm, and a coefficient of variation (CV value) of 18.3%. The yield of polymerization (the yield of polymer to the amount of monomers used) in this reaction was 99%.

(4) The fine resin particles obtained above was mixed with methyl methacrylate resin (PARAPET GH-SN; Kuraray Co., Ltd; refractive index: 1.491) for preparation and fused and kneaded using a laboplastomill (LABO PLASTO MILL; Toyo Seiki Seisaku-Sho, Ltd.) at 230° C. for 8 min at 60 rpm to produce 1 mass % of the light diffusive resin composition.

Figure 5:
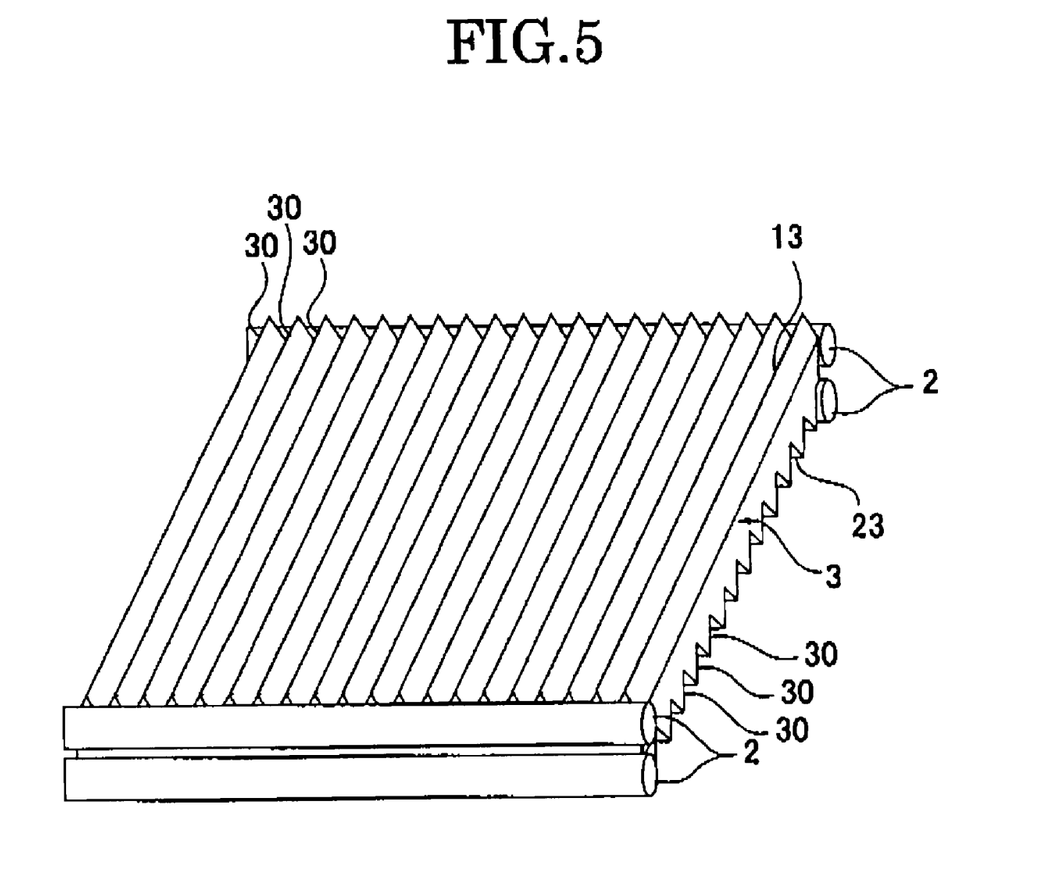
FIG. 5 is a schematic view showing a shape of a light guide with light control patterns in both sides which was used in evaluation of Table 1.

(5) The light diffusive resin composition was subjected to injection molding at 260° C. with 180 MPa using an injection molding machine (NADEM5000: MEIKI, Co., Ltd.) to produce a light guide for measurement. To the injection molding machine, a mold (278 mm long×339 mm wide×6 mm thick) capable of forming predetermined light control patterns (see FIG. 5) in both of the exit and reflection surfaces was attached. In this example, as shown in FIG. 5, the prisms 30 with triangular cross sections were formed in the exit and bottom surfaces 13 and 23 of the light guide as the light control patterns.

The master pellets produced in (4) and methyl methacrylate resin (PARAPET GH-SN; Kuraray Co., Ltd.; refractive index: 1.491) were mixed by dry blending to be adjusted to 0.05 mass % for use as the material. The evaluation of the image quality, in-plane chromaticity difference, and center brightness of the obtained light diffusive light guide is shown in Table 1.

Example 2

A light guide was obtained in the same way as Example 1 except preparing the material of 0.1 mass % by dry blending for molding. The evaluation of the image quality, in-plane chromaticity difference, and center brightness of the obtained light diffusive light guiding plate is shown in Table 1.

Example 3

A light guide was obtained in the same way as Example 1 except preparing the material of 0.2 mass % by dry blending for molding. The evaluation of the image quality, in-plane chromaticity difference, and center brightness of the obtained light diffusive light guiding plate is shown in Table 1.

Comparative Example 1

A light guide was obtained in the same way described in Example 1 using only methyl methacrylate resin (PARAPET GH-SN; Kuraray Co., Ltd.; refractive index: 1.491) as the material. The evaluation of the image quality, in-plane chromaticity difference, and center brightness of the obtained light diffusive light guide is shown in Table 1.

Comparative Example 2

A resin composition was obtained in the same way as Example 1 except that the composition of the monomers was as follows at the preparation of the resin composition.
(1) The following components were mixed to prepare the disperse-phase liquid.

| Monomer components: | |
|---|---|
| Methyl methacrylate | 26.25 g |
| Trifluoroethyl methacrylate | 18.75 g |
| Ethylene glycol dimethacrylate | 5.00 g |

The obtained fine resin particles were found to have a refractive index of 1.462, a number average particle size of 3.2 μm, and a coefficient of variation (CV value) of 19.2%, The yield of polymerization (the yield of polymer to the amount of monomers used) in this reaction was 99%.

The fine resin particles obtained above were mixed with methyl methacrylate resin (PARAPET GH-SN; Kuraray Co., Ltd; refractive index: 1.4915) for preparation and fused and kneaded using a laboplastomill (LABO PLASTO MILL; Toyo Seiki Seisaku-Sho, Ltd.) at 230° C. for 8 min at 60 rpm to produce 1 mass % of the light diffusive resin composition.

The thus obtained light diffusive resin composition was mixed with methyl methacrylate resin (PARAPET GH-SN; Kuraray Co., Ltd.; refractive index: 1.491) by dry blending to be adjusted to 0.04 mass %, and a light guide was obtained in the way described in Example 1. The evaluation of the image quality, in-plane chromaticity difference, and maximum center brightness of the obtained light diffusive light guiding plate is shown in Table 1.

Comparative Example 3

Tospearl 2000B (GE Toshiba silicone Co., Ltd.; refractive index: 1.428; number average particle size: 7.1 μm; coefficient of variation (CV value): 4.3%), which was commercially available as a silicon light diffusing agent, was mixed with methyl methacrylate resin (PARAPET GH-SN; Kuraray Co., Ltd.; refractive index: 1.491) for preparation and fused and kneaded using a laboplastomill (LABO PLASTO MILL; Toyo Seiki Seisaku-Sho, Ltd.) at 230° C. for 8 min at 60 rpm to produce 1 mass % of the light diffusive resin composition.

The thus obtained light diffusive resin composition was mixed with methyl methacrylate resin (PARAPET GH-SN; Kuraray Co., Ltd.; refractive index: 1.491) by dry blending to be adjusted to 0.015 mass %, and a light guide was obtained in the way described in Example 1. The evaluation of the image quality, in-plane chromaticity difference, and center brightness of the obtained light diffusive light guiding plate is shown in Table 1.

Example 4

Preparation of Resin Composition
(1) The following components were mixed to prepare a disperse-phase liquid.

| Monomer Components: | |
|---|---|
| Methyl methacrylate | 37.5 g |
| Ethylene glycol dimethacrylate | 12.5 g |
| Polymerization initiator: | |
| Lauryl peroxide | 0.294 g |

(2) Next, the following components were fused and mixed to prepare the continuous-phase liquid.

| | |
|---|---|
| Distilled water | 450 g |
| Polyvinyl alcohol (PVA-217; Kuraray Co., Ltd.) | 2.93 g |
| Sodium lauryl sulfate | 0.15 g |
| Sodium hydrogen carbonate | 0.23 g |
| Sodium nitrite | 0.294 g |

(3) The disperse-phase liquid and continuous-phase liquid were put in tanks of a membrane emulsification system (see FIG. 4), which includes a membrane module A, a nitrogen gas cylinder B, a disperse-phase liquid storage tank C, a continuous-phase liquid circulation tank D, a circulation pump E, a first valve F, a measuring instrument G for pressure and the like, and a second valve H. The membrane module A includes a porous glass cylinder (pore size: 0.90 μm, cylinder diameter: 10 mm, cylinder length: 20 mm). Subsequently, the continuous-phase liquid was caused to flow through the porous glass cylinder, and then the disperse-phase liquid was injected into the porous glass cylinder from the outside with a pressure difference of 0.072 MPa (72 KPa) to obtain emulsion.

The thus-obtained emulsion was put in a 1000 ml separable flask, and the suspension liquid was stirred at 130 rpm in a nitrogen atmosphere for polymerization at 75° C. for 6 hours, thus producing fine resin particles.

The obtained fine resin particles were found to have a refractive index of 1.495, a number average particle size of 3.04 μm, and a coefficient of variation (CV value) of 15.4%. The yield of polymerization (the yield of polymer to the amount of monomers used) in this reaction was 99%.

(4) The fine resin particles obtained above were mixed with methyl methacrylate resin (PARAPET GH-SN; Kuraray Co., Ltd; refractive index: 1.491) for preparation and fused and kneaded using a laboplastomill (LABO PLASTO MILL; Toyo Seiki Seisaku-Sho, Ltd.) at 230° C. for 8 min at 60 rpm to produce 1 mass % of light diffusive resin composition.

(5) The light diffusive resin composition was subjected to injection molding at 260° C. with 180 MPa using an injection molding machine (NADEM5000: MEIKI, Co., Ltd.) to produce a light guide for measurement. To the injection molding machine, a mold (278 mm long×339 mm wide×6 mm thick) capable of forming predetermined light control patterns (see FIG. 6) in both of the exit and reflection surfaces was attached.

Figure 6:
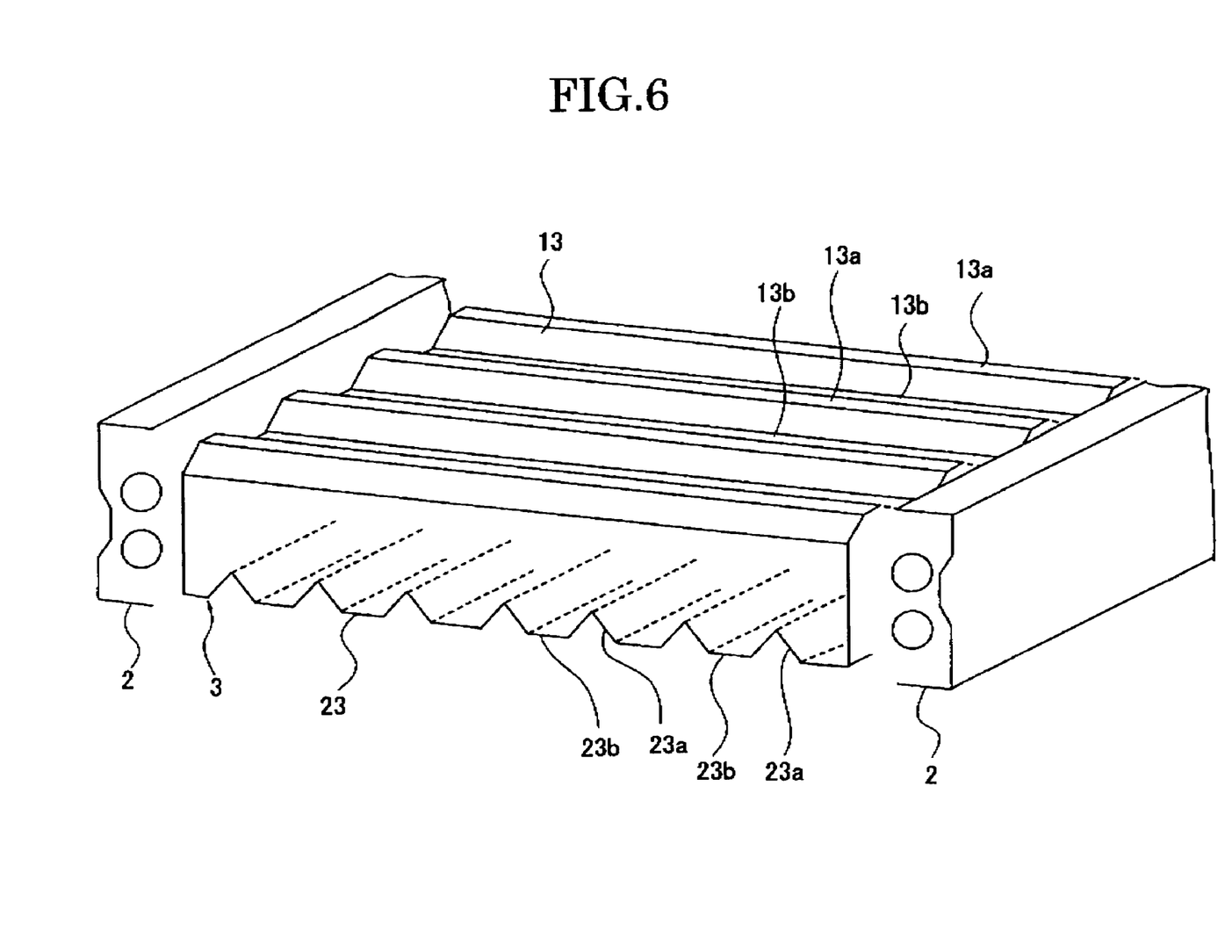
FIG. 6 is a schematic view showing a shape of a light guide with light control patterns in both sides which was used in evaluation of Table 2.

As shown in FIG. 6, in the exit surface 13 of the light guide 3 which was positioned in the front of the surface light source device 5, the ridges 13a with trapezoidal cross sections and the grooves 13b with trapezoidal cross sections were alternately arranged. In the rear surface 23 opposite to the exit surface 13, multiple grooves 23a with V-shaped cross sections were provided in parallel to each other to form multiple ridges 23b with trapezoidal cross sections. The grooves 23a were formed as the light control pattern whose longitudinal direction intersected with the longitudinal direction of the ridges 13a.

The master pellets produced in (4) and methyl methacrylate resin (PARAPET GH-SN; Kuraray Co., Ltd.; refractive index: 1.491) were mixed by dry blending to be adjusted to 0.1 mass % for use as the material. The evaluation of the image quality, in-plane chromaticity difference, and center brightness of the obtained light diffusive light guiding plate is shown in Table 2.

Example 5

A light guide was obtained in the same way as Example 4 except preparing the material of 0.2 mass % by dry blending for molding. The evaluation of the image quality, in-plane chromaticity difference, and center brightness of the obtained light diffusive light guiding plate is shown in Table 2.

Example 6

A light guide was obtained in the same way as Example 4 except preparing the material of 0.3 mass % by dry blending for molding. The evaluation of the image quality, in-plane chromaticity difference, and center brightness of the obtained light diffusive light guiding plate is shown in Table 2.

Example 7

A resin composition was obtained in the same way as Example 4 except that the composition of the monomers was as follows at the preparation of the resin composition.

| Monomer components: | |
| --- | --- |
| Methyl methacrylate | 38.50 g |
| Styrene | 6.50 g |
| Ethylene glycol dimethacrylate | 5.00 g |

The obtained fine resin particles were found to have a refractive index of 1.505, a number average particle size of 3.24 μm, and a coefficient of variation (CV value) of 18.5%. The yield of polymerization (the yield of polymer to the amount of monomers used) in this reaction was 99%.

The fine resin particles obtained above were treated in the same way as Example 1 to produce 1 mass % of light diffusive resin composition. Thereafter, the light diffusive resin was adjusted to 0.05 mass % by dry blending, and a light guide was obtained in the way described in Example 4. The evaluation of the image quality, in-plane chromaticity difference, and center brightness of the obtained light diffusive light guiding plate is shown in Table 2.

Example 8

A light guide was obtained in the same way as Example 7 except preparing the material of 0.1 mass % by dry blending for molding. The evaluation of the image quality, in-plane chromaticity difference, and center brightness of the obtained light diffusive light guiding plate is shown in Table 2.

Example 9

A light guide was obtained in the same way as Example 7 except preparing the material of 0.2 mass % by dry blending for molding. The evaluation of the image quality, in-plane chromaticity difference, and center brightness of the obtained light diffusive light guiding plate is shown in Table 2.

Example 10

The resin composition was obtained in the same way as Example 7 except that the conditions for emulsification were changed to the following conditions.

Porous glass cylinder
  Pore size: 1.60 μm; Cylinder diameter: 10 mm; Cylinder length: 20 mm
Pressure difference between inside and outside of the porous glass cylinder: 0.018 MPa (18 KPa)

The obtained fine resin particles were found to have a refractive index of 1.505, a number average particle size of 8.30 μm, and a coefficient of variation (CV value) of 9.2%. The yield of polymerization (the yield of polymer to the amount of monomers used) in this reaction was 99%.

The fine resin particles obtained above were treated in the same way as Example 4 to produce 1 mass % of light diffusive resin composition. Thereafter, the light diffusive resin was adjusted to 0.01 mass % by dry blending, and the light guide was obtained in the same way described in Example 4. The evaluation of the image quality, in-plane chromaticity difference, and center brightness of the obtained light diffusive light guiding plate is shown in Table 2.

Example 11

A light guide was obtained in the same way as Example 10 except preparing the material of 0.05 mass % by dry blending for molding. The evaluation of the image quality, in-plane chromaticity difference, and center brightness of the obtained light diffusive light guiding plate is shown in Table 2.

Example 12

A light guide was obtained in the same way as Example 10 except preparing the material of 0.1 mass % by dry blending for molding. The evaluation of the image quality, in-plane chromaticity difference, and center brightness of the obtained light diffusive light guiding plate is shown in Table 2.

Comparative Example 4

A light guide was obtained in the same way as described in Example 4 using only methyl methacrylate resin (PARAPET GH-SN; Kuraray Co., Ltd.; refractive index: 1.491) as the material. The evaluation of the image quality, in-plane chromaticity difference, and center brightness of the obtained light diffusive light guiding plate is shown in Table 2.

Comparative Example 5

A resin composition was obtained in the same way as Example 7 except that the composition of the monomers was as follows at the preparation of the resin composition.

| Monomer components: | |
| --- | --- |
| Methyl methacrylate | 13.6 g |
| Trifluoroethyl methacrylate | 31.5 g |
| Ethylene glycol dimethacrylate | 4.9 g |

The obtained fine resin particles were found to have a refractive index of 1.462, a number average particle size of 3.2 μm, and a coefficient of variation (CV value) of 19.2%. The yield of polymerization (the yield of polymer to the amount of monomers used) in this reaction was 99%.

The fine resin particles obtained as described above were treated in the same way as Example 7 to produce 1 mass % of light diffusive resin composition. Thereafter, the light diffusive resin composition was adjusted to 0.01 mass % by dry blending, and a light guide was obtained in the way described in Example 4. The evaluation of the image quality, in-plane chromaticity difference, and center brightness of the obtained light diffusive light guide is shown in Table 2.

Comparative Example 6

A light guide was obtained in the same way as Comparative Example 5 except preparing the material of 0.05 mass % by dry blending for molding. The evaluation of the image quality, in-plane chromaticity difference, and center brightness of the obtained light diffusive light guiding plate is shown in Table 2.

Comparative Example 7

A diffusive resin composition was produced in the same way as Example 7 except using, as a resin composition, Tospearl 2000B (GE Toshiba silicone Co., Ltd.; refractive index: 1.428; number average particle size: 7.1 μml coefficient of variation: 4.3%), which was commercially available as a silicone light diffusing agent, to produce 0.5 mass % of light diffusive resin composition. Thereafter, the light diffusive resin composition was adjusted to 0.01 mass % by dry blending, and a light guide was obtained in the way described in Example 4. The evaluation of the image quality, in-plane chromaticity difference, and center brightness of the obtained light diffusive light guiding plate is shown in Table 2.

Comparative Example 8

A light guide was obtained in the same way as Comparative Example 5 except preparing the material of 0.05 mass % by dry blending for molding. The evaluation of the image quality, in-plane chromaticity difference, and center brightness of the obtained light diffusive light guiding plate is shown in Table 2.

In the above Tables, |Δn| indicates an absolute value of the difference in refractive index.

(1) Image quality
 ○: There was no influence on the appearance.
 Δ: A few dark lines occurred but did not cause significant problem on the appearance.
 x: Dark lines degraded the quality of the appearance.

(2) Chromaticity difference
 Δx: an absolute value of a difference between a value at a chromaticity coordinate x of the point P1 of FIG. 3 and a value at a chromaticity coordinate x of the point P2 of FIG. 3

TABLE 1

| | | Comparative Example 1 | Example 1 | Example 2 | Example 3 | Comparative Example 2 | Comparative Example 3 |
|---|---|---|---|---|---|---|---|
| Dispersant | \|Δn\| | — | 0.016 | 0.016 | 0.016 | 0.029 | 0.063 |
| | Number Average Particle Size (μm) | — | 3.1 | 3.1 | 3.1 | 3.2 | 7.1 |
| | CV Value (%) | — | 18.3 | 18.3 | 18.3 | 19.2 | 4.3 |
| | Adding Amount (wt %) | 0 | 0.05 | 0.1 | 0.2 | 0.04 | 0.015 |
| Optical Characteristics Variation | Image quality | x | Δ | ○ | ○ | ○ | ○ |
| | Chromaticity x | ○ | ○ | ○ | ○ | Δ | Δ |
| | y | ○ | Δ | Δ | Δ | Δ | |
| | Center Brightness | — | ○ | ○ | Δ | Δ | x |
| Comprehensive Evaluation | | x | Δ | ○ | Δ | x | x |

TABLE 2

| | | Comparative Example 4 | Example 4 | Example 5 | Example 6 | Example 7 | Example 8 | Example 9 | Example 10 |
|---|---|---|---|---|---|---|---|---|---|
| Dispersant | \|Δn\| | — | 0.004 | ← | ← | 0.014 | ← | ← | ← |
| | Number Average Particle Size (μm) | — | 3.0 | ← | ← | 3.2 | ← | ← | 8.3 |
| | CV Value (%) | — | 15.4 | ← | ← | 18.5 | ← | ← | 9.2 |
| | Adding Amount (wt %) | 0.00 | 0.10 | 0.20 | 0.30 | 0.05 | 0.10 | 0.20 | 0.01 |
| Optical Characteristics | Image Quality | x | ○ | ○ | ○ | Δ | ○ | ○ | Δ |
| | Chromaticity Difference Δx | ○ | ○ | ○ | ○ | ○ | ○ | x | ○ |
| | Δy | ○ | ○ | ○ | Δ | ○ | Δ | x | ○ |
| | Center Brightness | — | ○ | ○ | ○ | ○ | ○ | ○ | ○ |
| Comprehensive Evaluation | | x | ○ | ○ | ○ | Δ | ○ | Δ | Δ |

| | | Example 11 | Example 12 | Comparative Example 5 | Comparative Example 6 | Comparative Example 7 | Comparative Example 8 |
|---|---|---|---|---|---|---|---|
| Dispersant | \|Δn\| | ← | ← | 0.029 | ← | 0.063 | ← |
| | Number Average Particle Size (μm) | ← | ← | 3.2 | ← | 7.1 | ← |
| | CV Value (%) | ← | ← | 19.2 | ← | 4.3 | ← |
| Optical characteristics | Adding Amount (wt %) | 0.05 | 0.10 | 0.01 | 0.05 | 0.01 | 0.05 |
| | Image Quality | ○ | ○ | Δ | ○ | x | ○ |
| | Chromaticity Difference Δx | ○ | 0 | ○ | x | ○ | Δ |
| | Δy | Δ | Δ | Δ | x | Δ | x |
| | Center Brightness | ○ | ○ | x | x | Δ | x |
| Comprehensive Evaluation | | ○ | ○ | x | x | x | x |

Δy: an absolute value of a difference between a value of at a chromaticity coordinate y of the point P1 of FIG. 3 and a value at a chromaticity coordinate y of the point P2 of FIG. 3 o: Δx, Δy ≦0 004
Δ: 0.004 <Δx, Δy≦0.006
x: 0.006 <Δx, Δy (3) Center Brightness Evaluation Center brightness was evaluated using a value of brightness of the light guide containing the diffusing agent at the point P1 of FIG. 3 divided by brightness of the light guide containing no diffusing agent.

o : L>0.09
Δ: 0.09≧L>0.85
x: 0.85≧L (4) Comprehensive Evaluation o: There was no comprehensive problem.

Δ: There was a slight problem but caused no significant trouble.

x: There was a significant problem which caused trouble.

The aforementioned experiments revealed that each of Examples 1 to 13 had more excellent qualities as a light guide of the surface light source device than Comparative Examples. Especially Examples 2, 4 to 6, 8, 11, and 12 exhibited excellent effects.

The aforementioned experiments revealed that each of Examples 1 to 3, which included the light guide having the base material of methyl methacrylate resin with dispersed fine particles with a refractive index of 1.505 and a number average particle size of 3.1 μm, had more excellent qualities as the light guide of the surface light source device than Comparative Examples. Especially Example 2, in which 0.1 mass % of the fine particles were dispersed, exhibited an excellent effect.

The present invention is a light guide for use in a surface light source device, which includes a methyl methacrylate resin and fine particles. Herein, not less than 0.01 parts by mass and not more than 0.5 parts by mass of the fine particles are dispersed in 100 parts by mass of the methyl methacrylate resin. In addition, the absolute value of a difference in refractive index between the fine resin particles and the methyl methacrylate resin is not less than 0.001 and not more than 0.02, the fine resin particles have an average particle size of not less than 1 μm and not more than 10 μm.

Since the absolute value of the difference in refractive index between the dispersed fine particles and methyl methacrylate resin is not less than 0.001 and not more than 0.02, such a light guide is allowed to have excellent diffusing characteristics without accurate adjustment of the amount of fine particles to be dispersed. It is therefore possible to improve the product quality and reduce the manufacturing cost.

FIELD OF THE INDUSTRIAL APPLICATION

The light guide according to the present invention is used in an edge light-type surface light source device to provide a surface light source device including the light guide and accordingly has a great industrial applicability.

<Priority Claim>

This PCT application claims the benefit of priority from prior Japanese Patent Application 2005-257280 filed on Sep. 6, 2005; the entire contents of which are incorporated by reference herein.

The invention claimed is:

1. A light guide for use in a surface light source device, the light guide, comprising:
    a methyl methacrylate resin, and
    fine particles,
    wherein
    not less than 0.01 parts by mass and not more than 0.5 parts by mass of the fine particles are dispersed in 100 parts by mass of the methyl methacrylate resin,
    an absolute value of a difference in refractive index between the fine resin particles and the methyl methacrylate resin is not less than 0.001 and not more than 0.02, and
    the fine resin particles have an average particle size of not less than 1 μm and not more than 10 μm.

2. The light guide for use in a surface light source device according to claim 1, the light guide further comprising:
    an exit surface;
    a bottom surface opposite and parallel to the exit surface;
    at least a pair of entrance end surfaces formed in side surfaces positioned between the exit and bottom surfaces and being opposite to each other; and
    a light source provided in each surface of the at least a pair of entrance end surfaces.

3. The light guide for use in a surface light source device according to claim 1, further comprising:
    an entrance surface; and
    a wedge cross section with a thickness gradually reduced with distance from the entrance surface, the surface light source device including a light source in the entrance surface.

4. The light guide according to claim 1, wherein
the methyl methacrylate resin is composed of a copolymer containing methacrylate methyl, and
the methacrylate methyl resin contains not less than 50 mass% and less than 100 mass% of methacrylate methyl.

5. The light guide according to claim 2, wherein
the methyl methacrylate resin is composed of a copolymer containing methacrylate methyl, and
the methacrylate methyl resin contains not less than 50 mass% and less than 100 mass% of methacrylate methyl.

6. The light guide according to claim 3, wherein
the methyl methacrylate resin is composed of a copolymer containing methacrylate methyl, and
the methacrylate methyl resin contains not less than 50 mass% and less than 100 mass% of methacrylate methyl.

7. The light guide according to claim 1, wherein
the fine particles are composed of a methacrylate resin.

8. The light guide according to claim 2, wherein
the fine particles are composed of a methacrylate resin.

9. The light guide according to claim 3, wherein
the fine particles are composed of a methacrylate resin.

10. The light guide according to claim 7, wherein
the methacrylate resin contains not less than 20 mass% and less than 99.9 mass% of methacrylate.

11. The light guide according to claim 7, wherein
methacrylate contained in the methacrylate resin is an alkyl methacrylate having an alkyl group with 1 to 12 carbon atoms.

12. The light guide according to claim 1, wherein
the fine particles contain a crosslinkable monomer.

13. The light guide according to claim 2, wherein
the fine particles contain a crosslinkable monomer.

14. The light guide according to claim 3, wherein the fine particles contain a crosslinkable monomer.

15. The light guide according to claim 1, wherein the coefficient of variation in size of the fine particles is not more than 50%.

16. The light guide according to claim 2, wherein the coefficient of variation in size of the fine particles is not more than 50%.

17. The light guide according to claim 3, wherein the coefficient of variation in size of the fine particles is not more than 50%.

18. The light guide according to claim 1, further comprising:
    a light control pattern for controlling outgoing light formed in the exit surface and bottom surface opposite to the exit surface.

19. The light guide according to claim 2, further comprising:
    a light control pattern for controlling outgoing light formed in the exit surface and bottom surface opposite to the exit surface.

20. The light guide according to claim 3, further comprising:
    a light control pattern for controlling outgoing light formed in the exit surface and bottom surface opposite to the exit surface.

21. The light guide according to claim 18, wherein the light control pattern is a trapezoidal prism.

22. The light guide according to claim 18, wherein the light control pattern performs a control to make half-value angles in all directions not more than 60° at a center part of the exit surface.

23. The light guide according to claim 18, wherein the light control pattern is a printed pattern.

24. A surface light source device, comprising:
    a light guide according to claim 1, 25. A surface light source device, comprising:
    a light guide according to claim 2, 26. A surface light source device, comprising:
    a light guide according to claim 3, 27. A surface light source device, comprising:
    a light source provided in each surface of the at least a pair of entrance surfaces opposite to each other, the entrance surfaces included in the light guide according to claim 2.

28. The surface light source device according to claim 24, wherein
    the light guide has a haze value of not less than 3% and not more than 30%.

29. The surface light source device according to claim 24, wherein
    variations in chromaticity ($\Delta x, \Delta y$) in the exit surface of the light guide are not more than 0.006.

* * * * *